H. E. RIDER.
AUTOMATIC STOP FOR PHONOGRAPHS AND OTHER ROTARY MECHANISM.
APPLICATION FILED JULY 29, 1915.
1,252,951.
Patented Jan. 8, 1918.
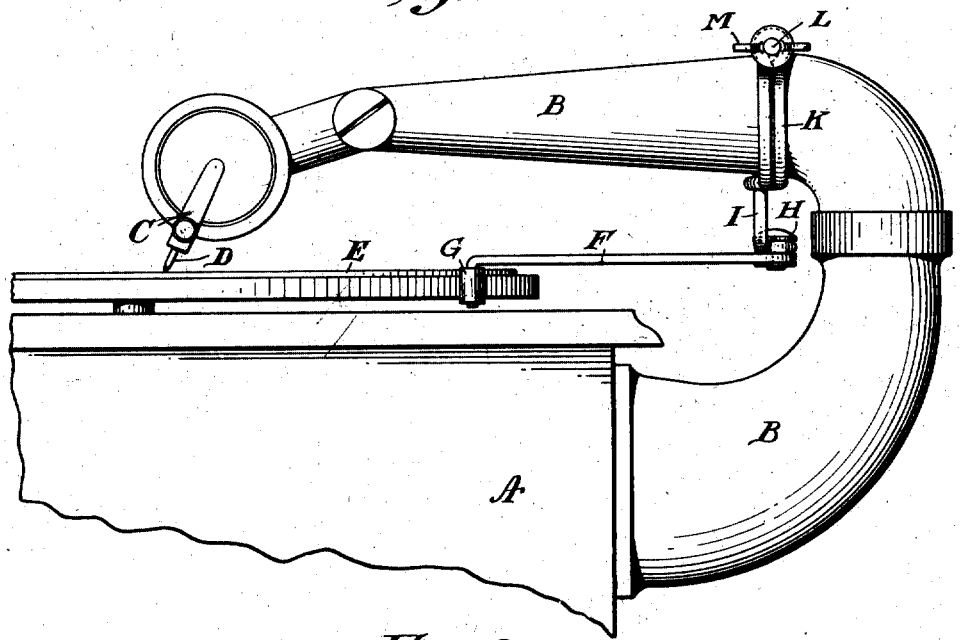
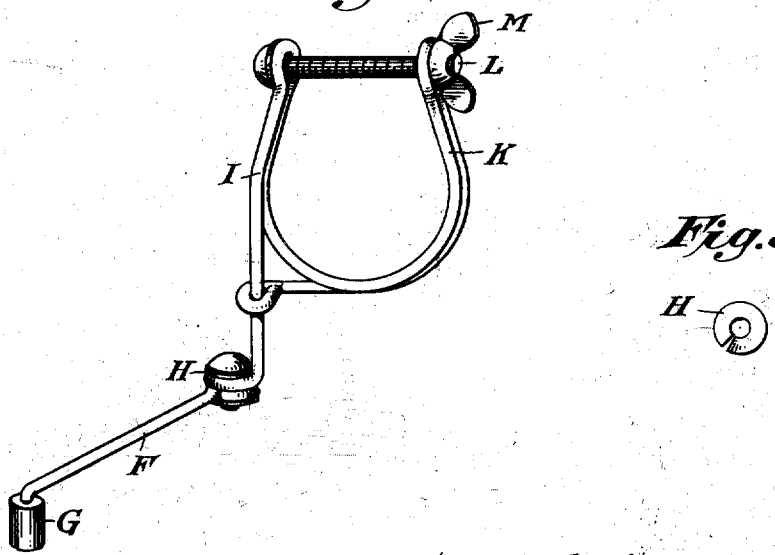
Attest:
N. McGinn
M. Davey
Inventor:
Herbert E. Rider
by W. P. Preble
Atty.

UNITED STATES PATENT OFFICE.

HERBERT E. RIDER, OF BROOKLYN, NEW YORK, ASSIGNOR TO AUTOMATIC PHONO-STOP COMPANY, INC., A CORPORATION OF NEW YORK.

AUTOMATIC STOP FOR PHONOGRAPHS AND OTHER ROTARY MECHANISM.

1,252,951.  Specification of Letters Patent.  Patented Jan. 8, 1918.

Application filed July 29, 1915. Serial No. 42,478.

*To all whom it may concern:*

Be it known that I, HERBERT E. RIDER, a citizen of the United States, and a resident of Brooklyn borough, New York city, and State of New York, have invented certain new and useful Improvements in Automatic Stops for Phonographs and other Rotary Mechanism, of which the following is a specific tion.

The object of my invention is to provide a simple, strong and effective automatic stop for phonographs and other machines, which comprise a rotating disk, drum, wheel or other rotary mechanism, which it may be desirable or advantageous to check silently and safely at some special point of its running.

Heretofore such stops as have been employed have, so far as I know, been complicated, too abrupt in their action, noisy and frequently requiring re-adjustment to insure a proper repeated action. In my device the action of the stop is absolutely regular and automatic, only one adjustment being required for a given size of rotary device to be acted upon; the braking action is preferably a rolling, silent application of what may be termed a spring like or elastic increasing pressure, whereby the rotary mechanism, however delicate, and through it the machine itself may be brought to a full stop without injury.

To this end my invention consists broadly of a suitable friction bracket, swingingly mounted upon a spring friction bearing, adapted to be adjusted in any desired position so that in its travel it will contact with the rotating device at such pre-determined point as may be desired and necessary for the proper stoppage thereof.

Many different forms of apparatus or bracket may be constructed, as desired, embodying this principle without departing from my invention and I have therefore selected for illustration in the accompanying drawings one of the simplest embodiments of my invention, namely a steel spring structure, adapted for application to the tone arm of a phonograph or talking machine the reproducer of which is fed across the record by a spiral groove.

This particular device can be manufactured at such small cost that it is available for use even with the least expensive phonographs.

Figure 1 is a side view showing this simple type of my device secured to the needle arm of the phonograph.

Fig. 2 is a perspective view of the stop or bracket as complete in itself, disconnected from the phonograph.

Fig. 3 is a top view of a split washer, which is a convenient form of spring friction bearing to permit and govern the adjustment of the bracket shown in Fig. 2.

Same letters indicate similar parts in the different drawings.

A, is the cabinet or casing containing the phonograph. B is the needle carrying arm. C is the needle holder. D is the needle and E is the phonograph disk, on which the needle travels. All these parts are of usual and well known construction.

My improved stop, as here shown, consists of a suitabe friction bracket F, having rolling friction tip G, and swingingly mounted upon a spring friction bearing H, which may take the form of a split washer as shown in Fig. 3, a spring bronze washer or other suitable forms.

This bracket is designed to press against the periphery of the phonograph disk E, at the proper time with sufficient yielding force to brake its action gently and stop its further rotation and therefore may be swingingly mounted in such relation to the needle carrying arm B, as may be necessary to cause said rolling tip to act at the exact instant desired. A convenient way of mounting this swinging bracket to accomplish this result is, as shown, a supporting spring arm I, which forms a part of an adjustable clutch loop or yoke K, adapted to be drawn together by the screw-bolt L, and winged-nut M. This adjustable yoke is designed to encircle some part of the needle carrying arm B and to grasp the same with sufficient firmness to be moved in unison with said needle arm.

Other and more elaborate forms of the friction bracket, spring friction bearing, and the supporting structure may be used if desired.

When this automatic stop is properly secured in position to move correspondingly with the needle carrying arm as shown, its adjustment to the phonograph disk is made as follows:—

A record being placed in position on the phonograph, the needle arm, before starting the mechanism, is moved so as to bring the needle directly over the last note indentation on the disk and the rolling tip is then brought by hand into proper contact with the edge of the disk by applying sufficient force to overcome the grip of the spring friction bearing, and is then released. The spring friction bearing thereupon holds the swinging bracket in that exact relation to the position of the needle carrying arm, until occasion should arise to alter the adjustment by again applying sufficient pressure to overcome the power of the friction bearing. The needle arm, carrying with it a swinging friction bracket, is now brought back to the beginning of the piece to be played and the phonograph is stopped.

It will thus be seen that as the needle, traveling over the disk, approaches the last note of the record thereon, the friction tip will be brought against the edge of the disk and gradually cause further rotation to cease, such grip becoming ultimately effective when the last note is reached.

The principle involved in this automatic stop, whether applied to phonographs or other moving or rotating mechanism or devices, is that the pressure constantly exerted by the friction bearing, around which the bracket turns should be sufficient to overcome with a somewhat yielding but continuous pressure the power which rotates or moves the apparatus which is to be stopped, but small enough to be itself overcome by hand when re-adjustment becomes necessary or desirable.

It will be evident that, if desired, the various parts constituting my improved stop may be made extensible or otherwise adjustable without in any way affecting the application of the above principle.

I claim:—

An automatic stop for phonographs and other rotary machines, which consists of a bracket, having a rolling friction tip, a spring friction bearing on which said bracket is mounted, adapted to exert an adjustable grip upon said bracket, and means for attaching the same to a tone arm of the machine.

HERBERT E. RIDER.

Witnesses:
 M. DAVEY,
 W. P. PREBLE.